United States Patent [19]

Danish et al.

[11] Patent Number: 5,121,472

[45] Date of Patent: Jun. 9, 1992

[54] METHOD FOR REPLACING KEYBOARD DATA USING SINGLE STEP PROCESS MODE

[75] Inventors: Sherif Danish, Sunnyvale; John C. Doering, San Jose; Kris Kimbrough, Sunnyvale, all of Calif.

[73] Assignee: Polytel Computer Products Corporation, Sunnyvale, Calif.

[21] Appl. No.: 359,622

[22] Filed: May 31, 1989

[51] Int. Cl.[5] .................... G06F 3/023; G06F 9/22; G06F 9/455; G06F 9/45

[52] U.S. Cl. .................. 395/275; 364/234.2; 364/234.4; 364/237.7; 364/280.1; 364/280.4; 364/280.8; 364/281.3; 364/284.4; 364/284.2; 364/281.7; 364/DIG. 1

[58] Field of Search ... 364/200 MS File, 900 MS File, 364/709.16, 709.12

[56] References Cited

U.S. PATENT DOCUMENTS

| | | | |
|---|---|---|---|
| Re. 32,040 | 11/1985 | Bagley | 364/900 |
| 4,488,258 | 12/1984 | Struger et al. | 364/900 |
| 4,641,262 | 2/1987 | Bryan et al. | 364/900 |
| 4,718,029 | 1/1988 | Morino et al. | 364/709.16 |
| 4,860,234 | 8/1989 | Lapeyre | 364/709.16 |
| 4,924,431 | 5/1990 | Lapeyre | 364/709.16 |
| 4,937,778 | 6/1990 | Wolf et al. | 364/900 |

Primary Examiner—Thomas C. Lee
Assistant Examiner—Daniel Pan
Attorney, Agent, or Firm—James E. Eakin

[57] ABSTRACT

In a computer system including a central processing unit, a program memory, a control program, a keyboard hardware interrupt handler routine and a single step interrupt handler routine, a method for replacing conventional data from a keyboard with user defined data including placing the central processing unit into single step mode, determining with the single step interrupt handler routine whether a keyboard hardware interrupt handler routine involves a keyboard data input instruction, and, if so, replacing the conventional data with user defined data, followed by either repeating the process or returning the system from single step mode to the main control program.

10 Claims, 5 Drawing Sheets

METHOD FOR REPLACING KEYBOARD DATA USING SINGLE STEP PROCESS MODE

FIELD OF THE INVENTION

The present invention relates to control of keyboard hardware interrupt handler routines within computing systems. More particularly, the present invention provides a method for emulation of keyboard generated data by automatic single step, test and replace within the interrupt handler routines so that instructions to obtain a keyboard value or data may be intercepted and new values provided by software to the keyboard hardware interrupt handler routine.

BACKGROUND OF THE INVENTION

Computer keyboards typically present two different values to the computer when a key is depressed. The first value, indicative of a key "make" is presented when a key is pressed, and the second value, indicative of a key "break", is presented when a depressed key is released. Each "make" or "break" generates a keyboard interrupt which interrupts the processor and calls a keyboard service subroutine. Once the keyboard service subroutine is invoked, it causes a data value from the keyboard data input port to be read by the processor and passed on to the program or stored at a predetermined character register location in memory. When the keyboard has been serviced, a return is made to the program and its execution resumes.

Computer keyboard macro subroutines are very useful because they can reduce keystroke sequences into one or two individual keystrokes which saves typing time and reduces the possibility of operator error. In the personal computer environment, keyboard macros can be created using special software tools known as "macro generators". These macro generators are memory resident programs which are able to send commands to application software such as the Lotus 1-2-3 (tm) spreadsheet program. A macro generator responds to a call by substituting its own routine for the standard system routine. When an application program is ready for a keyboard input, and when the user responds by typing a special keystroke, sequence, or combination defining a macro, e.g. Alt B for example, the substitute keyboard handling routines will send to the application software a sequence of keystrokes corresponding to the macro identified by Alt B.

In more specific terms, within the IBM (tm) PC/PS2 personal computer hardware environment, there are two standard keyboard handling routines called "interrupt nine (INT9)" and "interrupt sixteen (INT16)". INT9 is a hardware interrupt: the system hardware causes the INT9 keyboard interrupt handler to be executed every time that the user physically presses or releases any key on the keyboard. Upon execution of INT9, the standard keyboard handler routine reads a number (called the "scan code") of the activated key using an IN instruction to fetch the number from I/O Port 60. The scan code is then usually converted into a character code (e.g. the character "a") and is stored in a buffer or memory location called the keyboard buffer. INT16 is a software interrupt routine which is executed only when it is called by a program, such as Lotus 1-2-3 for example, when the program is ready for an input value from the keyboard. The standard INT16 handler obtains a character from the keyboard buffer and passes it along to the program requiring the character. Macro generators typically include their own keyboard interrupt handlers for INT9 and/or INT16.

Several widely used applications programs within the IBM personal computer environment, such as Microsoft Windows, Xerox Ventura Publisher, IRMA board control program for coaxial IBM 3270 emulation, and others, use their own internal keyboard hardware interrupt handlers in lieu of the standard keyboard interrupt handlers found within the system read-only memory (ROM) or within the system operating system, such as DOS. Macro generators which have been written for use with the DOS keyboard interrupt handlers often will not work with the special keyboard interrupt handlers found in these applications programs. Thus, a hitherto unsolved need has arisen for a method for making standard keyboard macro compatible with any form of special keyboard interrupt handler within any applications program.

Debuggers are diagnostic tools readily available to assembly language programmers. Debuggers typically provide at least two functions: single step execution with display of register values, and breakpoint execution wherein a program is executed to a particular point at which execution halts. The use of interrupts and the single step trace flag within the Intel 8088, 8086, 80286, 80386, etc., processor family is well understood and is clearly explained in an article by Jordan Lee Wagner, "How Debuggers Work", *Byte Magazine*, Vol 10, No. 11, Fall 1985, pp. 180-181. While single step techniques are known for monitoring program execution incident to debugging, they have not been heretofore applied to solving the problem of incompatibility of standard keyboard macros and special keyboard interrupt handler routines within certain applications programs.

SUMMARY OF THE INVENTION WITH OBJECTS

A general object of the present invention is to provide a macro generator which does not interfere with any operative form of a hardware interrupt handler with which the macro generator is operatively associated.

A more specific object of the present invention is to provide a method enabling automatic inspection of a selected program routine on an instruction by instruction basis in order to locate one or more predetermined instructions, and automatically modifying the data contents of one or more predetermined registers of the computing system in response to locating one of the predetermined instructions.

Another specific object of the present invention is to provide a keyboard macro generator which does not interfere with any operative form of keyboard hardware interrupt handler routine with which the macro generator is operatively associated.

Another specific object of the present invention is to provide a generalized keyboard macro generator to work with any software running within a computer employing a microprocessor of the Intel 80X86 family, including the IBM PC or PS2 operating environments for example, or within any computer comprising a microprocessor which offers program-invokable step by step instruction execution capabilities.

A method incorporating the principles of the present invention is provided for keyboard data step, test and replace within a personal computer including a processor executing a main program and capable of being placed in a single step mode by virtue of a single step flag state. The method includes the steps of:

calling the macro generator, placing the processor into a step-by-step mode by setting its single step flag, calling the keyboard hardware interrupt handler (INT9 in the IBM PC hardware), executing the called keyboard hardware interrupt handler one instruction at a time and returning to the macro generator after each instruction is executed, testing within the macro generator whether the instruction is a keyboard data input instruction, if the instruction calls for a keyboard data input, bypassing the actual data value at the keyboard data input location and substituting predetermined data for the actual data in at least one keyboard scan code register location, and continuing to fetch,.test and execute the remaining instructions of the interrupt handler routine on a single step and test basis until completed whereupon the single step flag is cleared and a return is made from the interrupt handler routine to the main program.

The method may also be for replacing actual data from a keyboard with replacement data under software control within a computing system including a central processing unit and a program memory containing a main control program containing instructions for sequential execution by the central processing unit and including a keyboard hardware interrupt handler routine and a single step interrupt handler routine. This replacement method of the present invention comprises the steps of:

placing the central processing unit into a single step mode, pointing an instruction processor of the central processing unit to the keyboard hardware interrupt handler routine for single step execution of the instructions thereof, pointing the instruction processor to the single step handler routine following each single step execution of an instruction of the keyboard hardware interrupt handler routine, examining at the central processing unit the next instruction of the keyboard hardware interrupt handler routine with the single step interrupt handler routine to see if the said next instruction is an a keyboard data input instruction for receiving data from the keyboard, if the said next instruction is a keyboard data input instruction, adjusting the return address to the program memory in order to bypass the said next instruction, and providing the keyboard replacement data to the central processing unit in lieu of the actual keyboard data, and if the said next instruction is not a keyboard data input instruction, returning control to the keyboard hardware interrupt handler routine so that the next instruction may be executed, continuing single step execution for every command of the keyboard hardware interrupt handler routine; and, at the end thereof removing the central processing unit from single step mode and returning control to the main control program.

In one aspect of the present invention the method is invoked automatically within the sequence of instructions of the main control program.

In a second aspect of the present invention the computing system includes a keyboard interface unit connected to the central processing unit via a parallel by bit data bus, and an interrupt line extends from the keyboard interface unit to send a keyboard hardware interrupt to the central processing unit for interrupting program execution whenever a key of the keyboard is pressed or released. In this second aspect the method is carried out when a keyboard hardware interrupt is actually received from the keyboard interface unit.

In a third aspect of the present invention the step of providing the keyboard replacement data to the central processing unit in lieu of the actual keyboard data is carried out by reference to the actual keyboard data which is being bypassed In a further and related aspect the actual keyboard data is used by the single step interrupt handler to point in memory to the replacement data to be provided to the central processing unit.

In a fourth aspect of the present invention the replacement data comprises a plurality or string (macro) of instructions to be executed in lieu of the single key scancode.

These and other objects, advantages, aspects and features of the present invention will be more fully understood and appreciated upon consideration of the following detailed description of a preferred embodiment presented in conjunction with the accompanying drawings.

DETAILED DESCRIPTION OF A PREFERRED EMBODIMENT

Figure 1:
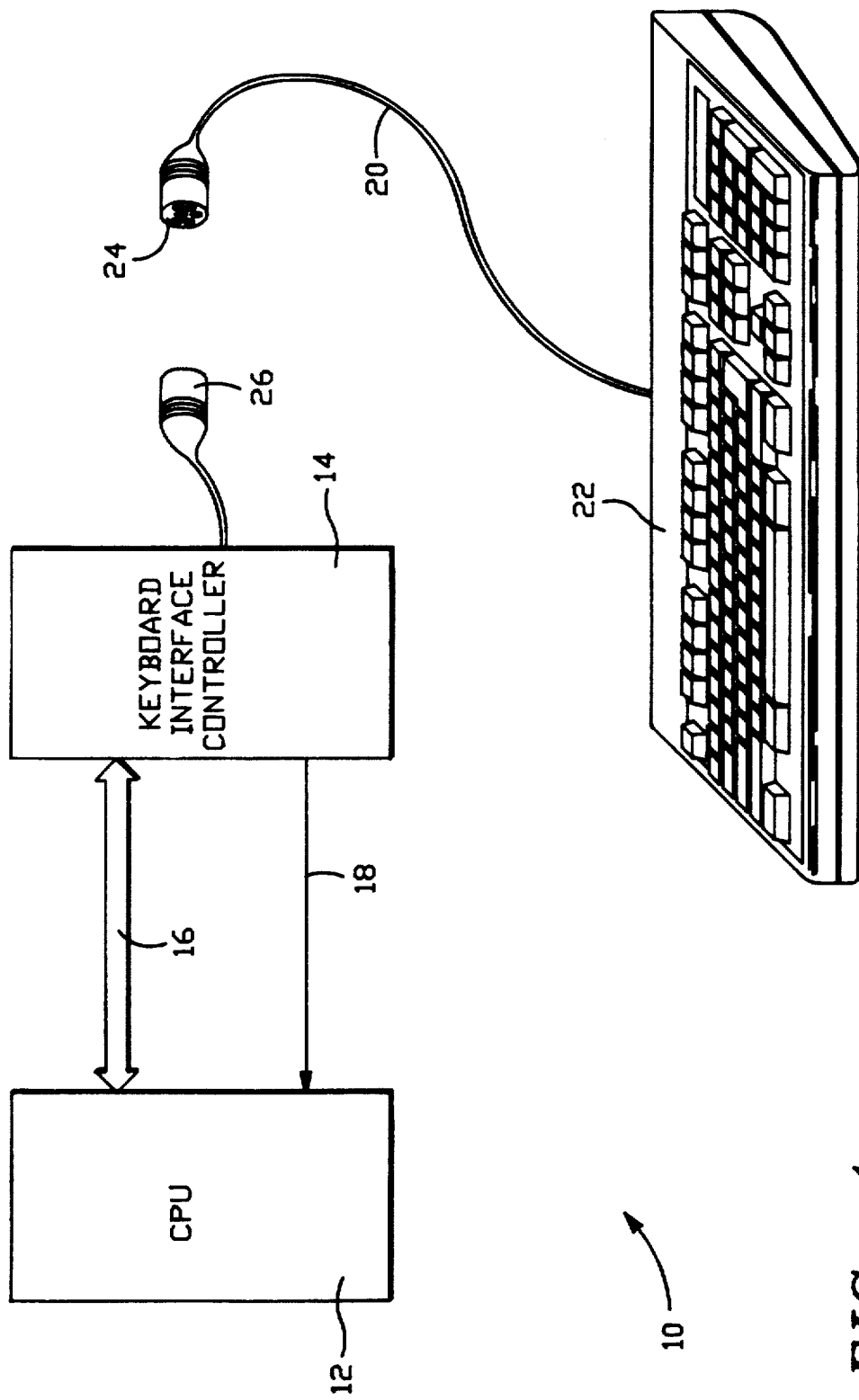
FIG. 1 is a block diagram of elements comprising functional portions of a personal computer including a keyboard, keyboard interface controller, bus, interrupt line and central processing unit.

With reference to FIG. 1, a typical personal computer 10 includes a central processing unit (CPU) 12, a keyboard interface controller 14, a bidirectional, parallel data bus 16 interconnecting the keyboard interface controller 14 and the CPU 12, and a unidirectional interrupt line 18 extending from the keyboard interface controller 14 to the CPU. A serial cable 20 leads from a keyboard 22 to the keyboard interface controller 14, typically via a plug 24 to jack 26 connection. The keyboard 22 may have any arrangement of keys; however, in most applications a standard QWERTY alphabet keyboard and a standard 10 key numerical keypad are provided as a minimum.

Whenever a key of the keyboard 22 is pressed or released, the keyboard 22 sends a code, in serial format through the serial data line 20 to the keyboard interface controller 14. The keyboard interface controller 14 then converts the data into a parallel data word or byte and sends a hardware interrupt signal to the CPU 12 over the interrupt line 18 in order to signal that a keyboard scan code is available.

The CPU 12 responds to this interrupt signal by executing a keyboard hardware interrupt handler routine to retrieve the key scan code from the keyboard interface controller 14 via the parallel data bus 16. The CPU 12 then interprets the scan code and takes appropriate action in response thereto.

Figure 2:
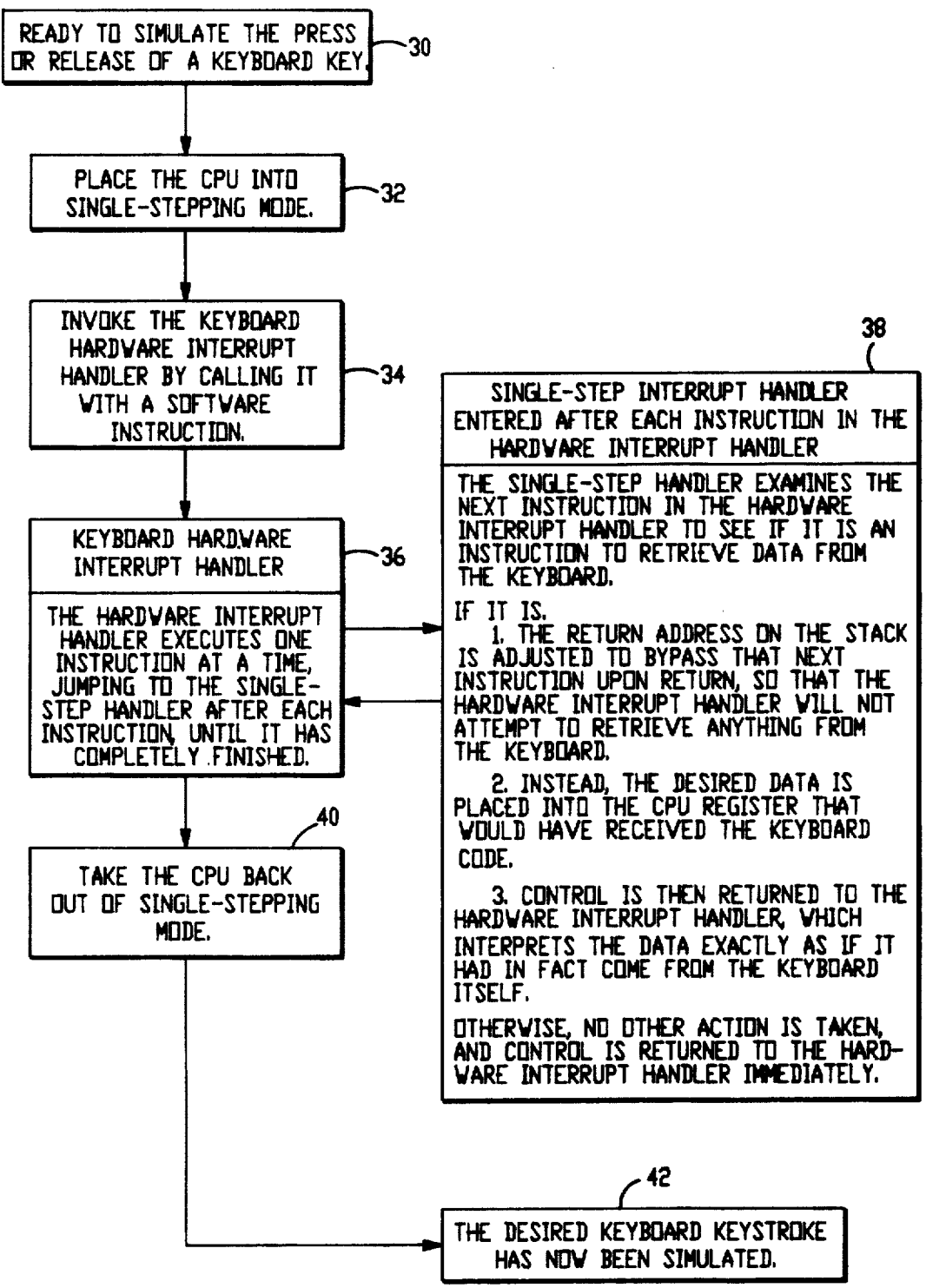
FIG. 2 is a functional block diagram of a single-step intercept and replace system incorporating the principles of the present invention.

FIG. 2 sets forth a functional block diagram of a hardware interrupt handler single-step and replace method 28 in accordance with the principles of the present invention. The functional capability of the system outlined in FIG. 2 is installed and used, e.g. within the FIG. 1 personal computing system 10, for example.

With reference to FIG. 2, the method begins at a block 30. The block 30 signals that the hardware system 10 is now ready to simulate the press or release of an actual key of the keyboard 22. The CPU 12 is placed into a single-step mode at a step 32. In the case of an INTEL 8088, 8086 or 80286 microprocessor, the single step mode is established by setting the TF flag at the ninth bit position from the lowest position of the sixteen bit flag register. As explained in the referenced article, "How Debuggers Work", one way to place the CPU 12 into a single-step trace mode is:

| | |
|---|---|
| MOV BP, SP | ; point to the top of stack |
| MOV AX, SS(BP+4) | ; get poshed flags in register AX |
| OR AX,0000000100000000B | ; turn on single-stepping mode |
| MOV SS(BP+4), AX | ; put back modified flags |

The keyboard hardware interrupt handler is then invoked by calling it with a software instruction at a block 34. This keyboard hardware interrupt handler is denoted by the block 36. Since the CPU 12 is now in the single step mode, the hardware interrupt handler 36 executes one instruction at a time, jumping to a single step handler routine, denoted by the block 38, after each instruction. After all of the instructions of the keyboard interrupt handler 36 have been executed, the trace flag of the CPU 12 is cleared, thereby taking the CPU out of single step mode at a block 40. The block 42 denotes that the desired keyboard keystroke has now been simulated by operation of the hardware interrupt handler single-step intercept and replace system 28.

The single step interrupt handler 38 examines each instruction presented to it by the keyboard hardware interrupt handler 36 in order to determine if the instruction is to retrieve data from the keyboard 22. If it is a keyboard data retrieval instruction, the return address on the stack is adjusted to bypass the next instruction upon return so that the hardware interrupt handler 36 will not attempt to retrieve any data directly from the keyboard 22. Instead, the desired keyboard keystroke simulation data is placed into the keyboard register that would have received the keyboard data from the keyboard interface controller 14 via the parallel bus 16. Control is then returned to the hardware interrupt handler 36. The hardware interrupt handler 36 then interprets the simulation data in the keyboard register of the CPA exactly as if the simulation data had been real data from the keyboard 22. In the event that the instruction undergoing examination by the single-step interrupt handler 38 is not an instruction to retrieve data from the keyboard, no action is taken by the single-step handler 38, and the keyboard handler 36 executes the instruction immediately.

Figure 3A:
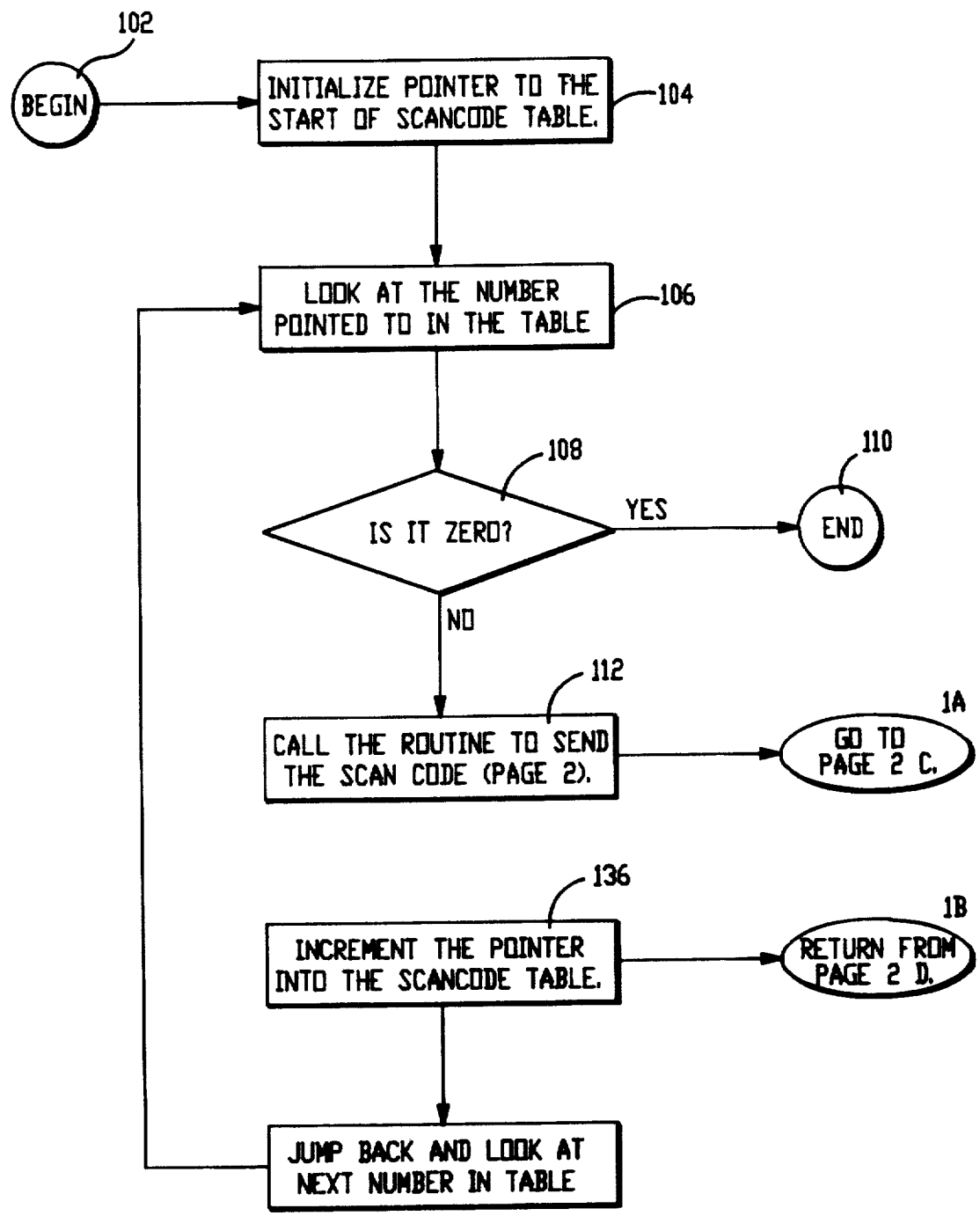
FIGS. 3A, 3B and 3C together comprise a single flowchart diagram of a program implementing the FIG. 2 system.

FIG. 3 sets forth a flowchart of a simple program 100 illustrating the single-step intercept and replace method 28 of the present invention. Program execution begins at a begin node 102 and immediately progresses to a node 104 at which the pointer is initialized to the start of a scancode table. The number pointed to in the scancode table is obtained at a node 106 and tested at a logical node 108. If the value of the number is zero, the program is ended at a node 110 (and a return is made to the main program.

If the value of the number is not zero, a routine is called to send the scan code at a node 112. The single-step interrupt vectors are redirected at a node 114. The CPU 12 is then placed into the single-step mode at a node 116. The Interrupt 9 keyboard handler routine is then invoked at a node 118.

During execution of the Interrupt 9 keyboard handler a jump is made at a node 120 to the single-step handler before each machine instruction is carried out. Within the single-step handler, a return address is obtained from the stack at a node 122 (FIG. 3C). The opcode instruction pointed to by the stack pointer is then examined at a node 124. A logical node 126 then determines if the opcode undergoing examination is one to retrieve a keyboard scan code from the keyboard interface controller 14. If it is, a node 128 causes the return address on the stack to be incremented by one in order to bypass this instruction. Next, at a node 130 the simulation scan code is retrieved from the scancode table as pointed to by the scancode table pointer.

Figure 3B:
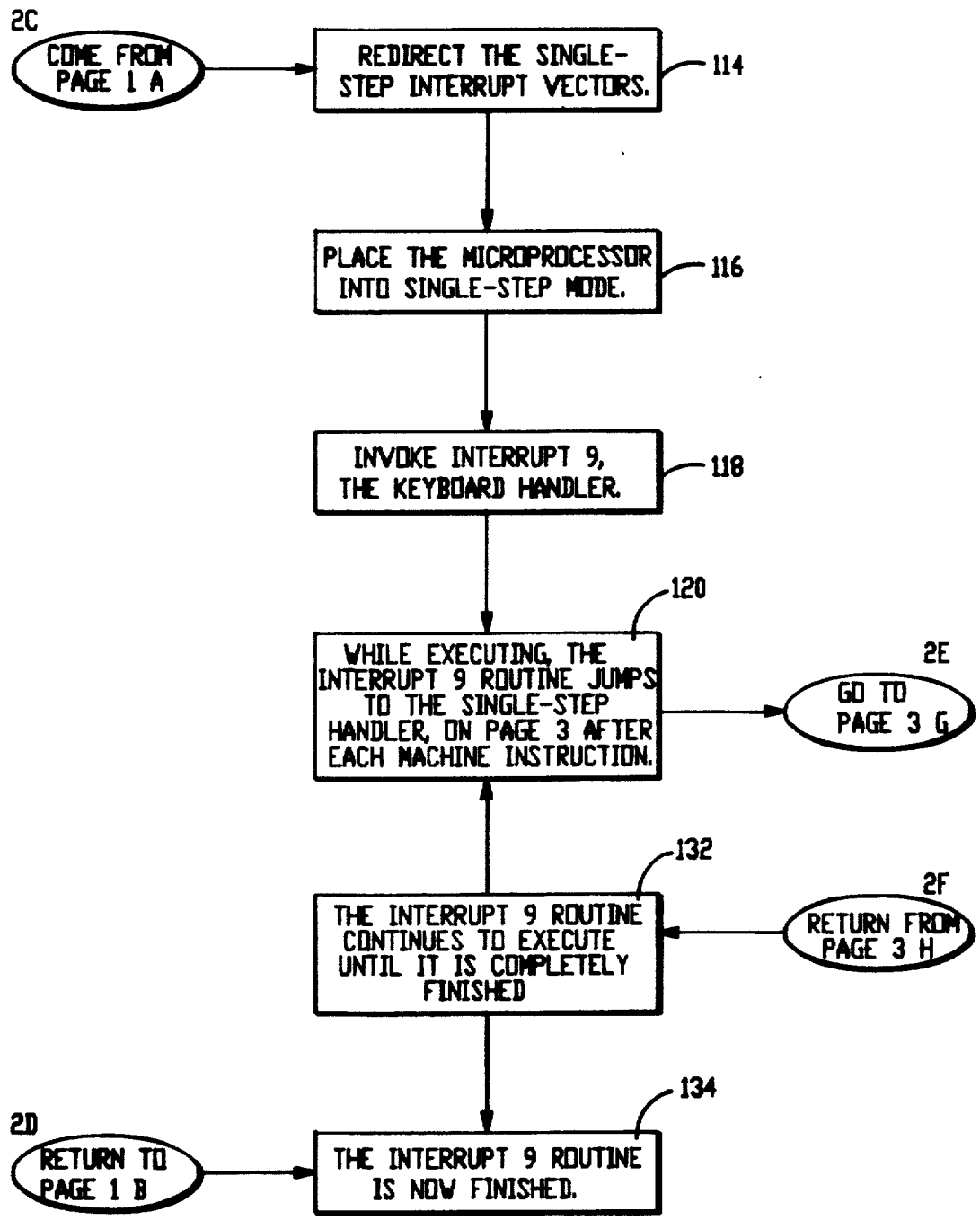
Figure 3C:
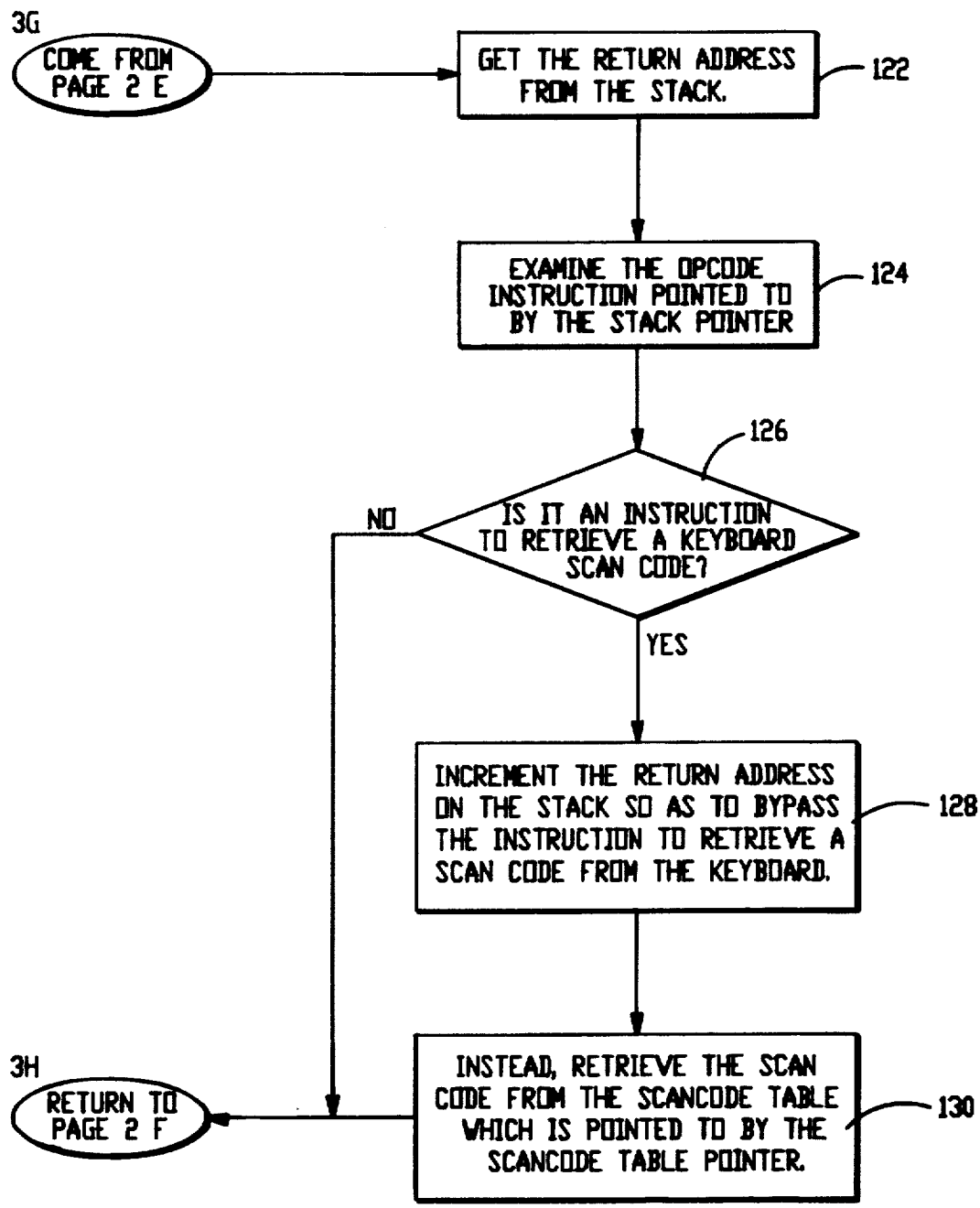

Then, a return is made to the Interrupt 9 keyboard handler at a node 132 (FIG. 3B). The Interrupt 9 handler continues to execute by returning to the node 120 until it is completely finished, as indicated by progression to a node 134. A return is made to a node 136 (FIG. 3A) at which the pointer in the scancode table is incremented by one. At a node 138 a jump is made back to the node 106 at which the next number in the scancode table is obtained. This program continues, as explained, until the number pointed to in the scancode table is zero and the end node 110 is reached.

Here follows a program written in 80XX Intel Hex Format assembly language with comments which implements the program set forth in the flow chart.

Docket H-1095-P

```
;
;
CODESEG    SEGMENT 'CODE'
           ASSUME  CS:CODESEG,DS:CODESEG,SS:CODESEG,ES:CODESEG
           ORG     0100H
SINGSTEP   PROC    NEAR
           JMP     BEGIN           ;Jump around the following data.
;
; The following table is a list of numbers representing the scan codes
; produced by the keyboard when the listed keys are pressed and released.
; The entire list, when sent to the computer system via repeated use of
```

```
; the single-step intercept and replace technique, simulates the typing
; of the DOS command "dir" followed by Enter:
;
SCANCODE_TABLE  DB      020H,0A0H               ;Press and release "d"
                DB      017H,097H               ;Press and release "i"
                DB      013H,093H               ;Press and release "r"
                DB      01CH,09CH               ;Press and release "Enter"
                DB      0                       ;0 = end of list.
;
; The following value is a pointer into the above list, enabling this
; program to keep track of where it is in the list. It will be incremented
; as each number is retrieved from the list and passed through the single-
; step technique. Thus, it always points to the next number to retrieve
; from the list:
;
TABLE_POINTER   DW      0
;
;-----------------------------------------------------------------------
; The actual program code begins here:
;
BEGIN:          CLD
                MOV     AX,CS
                MOV     DS,AX                   ;Set DS register to this segment.
                MOV     ES,AX                   ;Set ES register to this segment.
;
; Initialize the table pointer to point to the beginning of the table:
;
                MOV     TABLE_POINTER,OFFSET SCANCODE_TABLE
;
; Retrieve the next number from the scancode table and put it into
; the AL register. The only purpose in doing this is simply to see
; if the number is zero:
;
GET_NUMBER:     MOV     SI,TABLE_POINTER        ;Use SI as the index register.
                MOV     AL,[SI]                 ;Get the number into AL.
                CMP     AL,0                    ;Is it 0 (end of list)?
                JZ      ALL_DONE                ;Yes. All done, so quit.
;
; The number retrieved from the table is not zero, so it represents a
; keyboard scan code. Simulate the keystroke that would normally produce
; this scan code by forcing the code through the keyboard interrupt
; handler (interrupt 9) with the single-stepping technique:
;
                CALL    SEND_SCANCODE
;
; Now increment the table pointer the the next number in the list,
; and loop back to retrieve it and do the process once again:
;
                INC     TABLE_POINTER
                JMP     GET_NUMBER
;
; The number retrieved from the list was 0, which means we've reached
; the end of the list, so we're done. Terminate this program and return
; control back to DOS:
;
ALL_DONE:       INT     20H                     ;Quit and go back to DOS.
SINGSTEP        ENDP
;
;-----------------------------------------------------------------------
; Subroutines begin here:
;
;
; Subroutine SEND_SCANCODE.
;
; This subroutine invokes the keyboard interrupt handler (interrupt 9).
; Before doing this, the single-step handler (interrupt 1) must first
; be enabled by changing the system interrupt 1 vectors to point to our
; single-step handler code and turning on the microprocessor's single-
; step mode. It is the job of our interrupt 1 (single-step) handler to
; substitute the desired scan code into the interrupt 9 (keyboard) handler
```

```
; at just the right places.  After the interrupt 9 routine returns to this
; subroutine, the microprocessor single-step mode is turned off and the
; interrupt 1 vectors are restored to their original values.
;
; Inputs:      TABLE_POINTER must point to the desired entry in the table.
;
; Outputs:     None.
;
; Registers:   BP is destroyed.  All other registers are preserved.
;
SEND_SCANCODE   PROC    NEAR
;
; First, set the interrupt 1 (Single Step Interrupt) vector to our
; single step handler:
;
                CALL    SET_INTVECS
;
; Turn on single step mode by setting the single-step bit in the 8088's
; flags register.  This can only be done by transferring the flags into
; the AX register (via the stack), setting the bit in AX, then transferring
; the modified AX back into the flags register:
;
                PUSHF                   ;Push the flags onto the stack.
                MOV     BP,SP           ;Use BP to index into the stack.
                MOV     AX,[BP]         ;Get stack contents (flags) into AX.
                OR      AH,1            ;Set the single-step bit on.
                MOV     [BP],AX         ;Put modified value back into stack.
                POPF                    ;Pop modified flags from stack.
;
; Call interrupt 9.  The processor will single step through the current
; interrupt 9 handler, invoking our single step handler after each instruction.
;
; NOTE:  You can't call interrupt 9 with an INT 9 instruction, because this
;        will cause the 8088 to turn off the single step flag and stop single
;        stepping.  So the interrupt 9 handler has to be called with a CALL
;        instruction instead:
;
                PUSH    ES
                MOV     AX,0
                MOV     ES,AX           ;Set the ES register to zero.
                PUSHF
                CLI
                CALL    Dword Ptr ES:[36]  ;Call interrupt 9.
                POP     ES              ;Restore ES to original value.
;
; The interrupt 9 handler is finished.  We have sent one scan code.
; Turn single stepping off:
;
                PUSHF
                MOV     BP,SP
                MOV     AX,[BP]
                AND     AH,0FEH
                MOV     [BP],AX
                POPF
;
; Put the interrupt 1 vectors back the way they were:
;
                CALL    RESTORE_INTVECS
;
; Return to the main program:
;
                RET
SEND_SCANCODE   ENDP
;
;------------------------------------------------------------------------
; Subroutine SET_INTVECS.
;
ORIG_INT1       DW      0,0     ;Save the original interrupt vectors here.
;
; This subroutine retrieves the existing interrupt 1 vectors and saves them,
```

; then points the vectors to our interrupt 1 (single step) handler.
;
```
SET_INTVECS     PROC    NEAR
                PUSH    BX
                PUSH    AX
                PUSH    DI
                PUSH    ES
                SUB     AX,AX
                MOV     ES,AX           ;Set ES to segment 0.
                MOV     DI,4            ;Point ES:DI to interrupt 1 vector.
                MOV     AX,ES:[DI]      ;Get the vector offset into AX.
                MOV     BX,ES:[DI+2]    ;Get the vector segment into BX.
                MOV     ORIG_INT1,AX    ;Save the current vectors so
                MOV     ORIG_INT1+2,BX  ; they can be restored later.
                CLI
                MOV     AX,OFFSET INT1_HANDLER
                STOSW                   ;Set the vector to point to our
                MOV     AX,CS           ; single step handler.
                STOSW
                STI
                POP     ES
                POP     DI
                POP     AX
                POP     BX
                RET
SET_INTVECS     ENDP
```
;
;----------------------------------------------------------------------
; Subroutine RESTORE_INTVECS.
;
; This subroutine puts the vectors for interrupt 1 back the way they were.
;
```
RESTORE_INTVECS PROC    NEAR
                PUSH    AX
                PUSH    DI
                PUSH    ES
                SUB     AX,AX
                MOV     ES,AX           ;Set ES to segment 0.
                MOV     DI,4
                CLI
                MOV     AX,ORIG_INT1
                STOSW
                MOV     AX,ORIG_INT1+2
                STOSW
                STI
                POP     ES
                POP     DI
                POP     AX
                RET
RESTORE_INTVECS ENDP
```
;
;----------------------------------------------------------------------
; Single Step Handler.
;
; Local temporary storage for this handler:
;
```
BPSAVE          DW      0
AXSAVE          DW      0
SISAVE          DW      0
DSSAVE          DW      0
BPTEMP          DW      0
AXTEMP          DW      0
;
INT1_HANDLER    PROC    FAR
```
;
; This handler is invoked automatically by the microprocessor after each
; instruction in the interrupt 9 handler. It will examine the instruction
; within the interrupt 9 handler at the return address on the stack
; (which will be the next instruction to execute after this handler returns),
; looking specifically for an "IN AL,60" (E4 60) instruction or an "IN AL,DX"
; (EC) instruction with DX=0060H. When this handler finds it, it will set
; AL to the desired scan code value, retrieved from the scan code table,

```
; and then it will increment the return address in the stack so that
; when this handler returns, the IN instruction in the interrupt 9 handler
; will be bypassed. At that point in the interrupt 9 handler, AL will
; contain the value we specified rather than some value obtained from the
; keyboard with an IN instruction. The remainder of the interrupt 9 handler
; will still continue to execute (albeit somewhat slowly because single
; stepping will still be on).
;
                ASSUME  DS:NOTHING
;
; Save the CPU registers. To avoid confusion, don't use the stack:
;
                MOV     CS:BPSAVE,BP
                MOV     CS:AXSAVE,AX
                MOV     CS:SISAVE,SI
                MOV     CS:DSSAVE,DS
;
; Copy the current stack pointer into BP. This points to the place in the
; stack that holds the address of the next instruction in the int 9 handler:
;
                MOV     BP,SP
;
; Get the address from the stack into DS:SI:
;
                MOV     SI,[BP]
                MOV     DS,[BP+2]
;
; Get the machine instruction which is at that address:
;
                LODSW                   ;Also increment SI by 2.
;
; The machine opcode is now in AX. See if it is E4 60 (IN AL,60) or
; if it is EC (IN AL,DX) and DX also = 0060. If it is neither one,
; return without doing anything:
;
                CMP     AX,60E4H        ;Is it an IN AL,60 instruction?
                JE      INT1B           ;Yes. Skip the next 5 lines.
                CMP     AL,0ECH         ;Is it an IN AL,DX instruction?
                JNE     INT1RET         ;No. Return immediately.
                CMP     DX,0060H        ;Yes. Is DX also = 0060?
                JNE     INT1RET         ;No. Return immediately.
;
; We have found an IN AL,DX instruction. Decrement SI because we only want
; to skip past this one-byte instruction:
;
                DEC     SI
;
; We have found an IN AL,60 opcode or an IN AL,DX opcode with DX=0060.
; Bump the return address in the stack by 2 or by 1, depending in SI, which
; is either 1 or 2 more than it was to start with:
;
INT1B:          MOV     [BP],SI
;
; Retrieve the desired scan code from the table and put it into AL:
;
                MOV     SI,CS:TABLE_POINTER
                MOV     AL,CS:[SI]
                MOV     Byte Ptr CS:AXSAVE,AL
;
; Restore all registers and return:
;
INT1RET:        MOV     DS,CS:DSSAVE
                MOV     SI,CS:SISAVE
                MOV     AX,CS:AXSAVE
                MOV     BP,CS:BPSAVE
                IRET
INT1_HANDLER    ENDP
;
;----------------------------------------------------------------------
;
CODESEG         ENDS
                END     SINGSTEP
```

Having thus described an embodiment of the invention, it will now be appreciated by those skilled in the art that the objects of the invention have been fully achieved, and it will be understood by those skilled in the art that many changes in construction and widely differing embodiments and applications of the invention will suggest themselves without departing from the spirit and scope of the present invention. The disclosures and the description herein are purely illustrative and are not intended to be in any sense limiting.

We claim:

1. In a computing system having a keyboard with keys, a central processing unit and a program memory containing a main control program comprising instructions for execution by the central processing unit and including a keyboard hardware interrupt handler routing and a single step interrupt handler routine, a method for replacing actual data from a keyboard with stored user defined data comprising the steps of
   placing the central processing unit into a single step mode when a key is depressed,
   causing an instruction processor of the central processing unit to use the keyboard hardware interrupt handler routine for single step execution of the instructions thereof,
   causing the instruction processor to use the single step handler routine following each single step execution of an instruction of the keyboard hardware interrupt handler routine,
   causing the central processing unit to use the single step interrupt handler routine to examine the next instruction of the keyboard hardware interrupt handler routine to see if such next instruction is a keyboard data input instruction for receiving data from the keyboard and, if so, to bypass normal keyboard data and instead retrieve a selected portion of the stored user defined data,
   continuing said single step execution for every command of the keyboard hardware interrupt handler routine, and
   removing the central processing unit from single step mode and returning control to the main control program.

2. The method set forth in claim 1 wherein the steps of the method are invoked from within the main control program.

3. The method set forth in claim 1 wherein the computing system includes a keyboard interface unit connected to the central processing unit via a parallel by bit data bus, and wherein an interrupt line extends from the keyboard interface unit to send a keyboard hardware interrupt to the central processing unit for interrupting program execution whenever a key of the keyboard is pressed or released, and wherein the said method is carried out when a keyboard hardware interrupt is received from the keyboard interface unit.

4. The method set forth in claim 3 wherein the step of providing the keyboard replacement data to the central processing unit in lieu of the actual keyboard data is carried out by reference to the actual keyboard data which is being bypassed.

5. The method set forth in claim 4 further comprising using the actual keyboard data by the single step interrupt handler to point in memory to the replacement data to be provided to the central processing unit.

6. The method set forth in claim 5 wherein the replacement data comprises a plurality of instructions.

7. In a personal computer including a keyboard having keys thereon each having associated therewith an actual data value as defined by a keyboard scan code, memory having stored therein keyboard re-definition data, and a processor executing a main control program and capable of being placed in single step mode by setting a single step flag, the method for keyboard data replacement of
   calling a macro generator in response to a key being depressed,
   placing the processor in single step mode by setting the single step flag,
   calling a keyboard hardware interrupt handler routine comprising at least one instruction,
   executing the called keyboard hardware interrupt handler routine one instruction at a time and returning to the macro generator after each instruction is executed,
   testing within the macro generator whether the instruction is a keyboard data input instruction, and, if so,
   bypassing the actual data value of the depressed key at the keyboard data input and substituting therefor a predetermined portion of the stored keyboard redefinition data for at least one keyboard scan code, and
   returning from the keyboard hardware interrupt handler routine to the main control program.

8. The method set forth in claim 7, wherein the processor is compatible with the 80XXX family of microprocessors, and the keyboard hardware interrupt is INT9.

9. The method set forth in claim 7 further comprising the further step of providing the replaced value placed into the one keyboard scan code register location to a program for execution.

10. The method set forth in claim 9 wherein the processor is compatible with the 80XXX family of microprocessors, the keyboard hardware interrupt is INT9, and the step of providing the replaced value to a program is accomplished by an INT16.

* * * * *